US008733744B2

(12) United States Patent
Kerr et al.

(10) Patent No.: US 8,733,744 B2
(45) Date of Patent: May 27, 2014

(54) MULTIPIECE CUSHIONING ASSEMBLY FOR A TELESCOPING SHOCK ABSORBING ASSEMBLY

(75) Inventors: Ronald W. Kerr, Geneva, IL (US); Helen Y. Chen, Aurora, IL (US); Richard J. Beranek, Maple Park, IL (US)

(73) Assignee: Miner Elastomer Products Corporation, Geneva, IL (US)

( * ) Notice: Subject to any disclaimer, the term of this patent is extended or adjusted under 35 U.S.C. 154(b) by 158 days.

(21) Appl. No.: 13/136,824

(22) Filed: Aug. 11, 2011

(65) Prior Publication Data

US 2013/0038005 A1 Feb. 14, 2013

(51) Int. Cl.
*B60G 15/00* (2006.01)

(52) U.S. Cl.
USPC ........ 267/195; 267/64.26; 267/139; 267/140; 267/292; 267/136; 280/124.177

(58) Field of Classification Search
USPC ........... 267/136, 64.26, 64.15, 139, 140, 195, 267/292, 64.21, 64.24; 293/135, 136; 280/124.177
See application file for complete search history.

(56) References Cited

U.S. PATENT DOCUMENTS

| | | | | |
|---|---|---|---|---|
| 2,469,126 | A | | 5/1949 | Munro et al. |
| 3,372,947 | A | * | 3/1968 | Doennecke ............ 280/124.111 |
| 3,434,708 | A | | 3/1969 | Hawk et al. |
| 3,537,696 | A | | 11/1970 | Webster et al. |
| 3,713,666 | A | * | 1/1973 | Cheers et al. .......... 280/124.177 |
| 4,159,105 | A | * | 6/1979 | Vander Laan et al. ........ 267/218 |
| 4,260,142 | A | * | 4/1981 | Stiefel et al. ................ 267/204 |
| 4,428,565 | A | * | 1/1984 | Stiefel et al. ................ 267/207 |
| 4,756,512 | A | | 7/1988 | Toms, Jr. |
| 4,877,222 | A | * | 10/1989 | Davis ......................... 267/64.13 |
| 4,997,171 | A | | 3/1991 | Toms, Jr. |
| 5,160,123 | A | * | 11/1992 | Danieli ........................ 267/226 |
| 5,183,137 | A | | 2/1993 | Siwek et al. |
| 5,240,269 | A | * | 8/1993 | Kerr ............................ 280/285 |
| 5,401,053 | A | * | 3/1995 | Sahm et al. ................ 280/5.502 |
| 5,676,265 | A | * | 10/1997 | Miller ............................ 213/49 |
| 5,845,796 | A | | 12/1998 | Miller |
| 6,199,708 | B1 | | 3/2001 | Monaco |

(Continued)

FOREIGN PATENT DOCUMENTS

EP 0 277 788 A2 8/1988

OTHER PUBLICATIONS

Hitachi Heavy Equipment, Inc.; Drawing No. 12618728; 7263 Strut, Rear; undated.

*Primary Examiner* — Thomas J Wiliams
*Assistant Examiner* — Mariano Sy
(74) *Attorney, Agent, or Firm* — Law Office of John W. Harbst

(57) ABSTRACT

A multipiece cushioning assembly adapted to be arranged in combination with a shock absorbing apparatus. The multipiece cushioning assembly is disposed between a pair of radial shoulders on first and second members telescoping members of the shock absorbing apparatus arranged in operable combination relative to each other. The radial shoulders on the first and second members limit travel of the shock absorbing apparatus, and with the multipiece cushioning assembly including a plurality of elastomeric bumpers arranged in a generally circular array for absorbing over-travel of the first and second members relative to each other and for readily permitting replacement of the multipiece cushioning assembly while maintaining the first and second members in operable combination relative to each other.

30 Claims, 7 Drawing Sheets

(56) References Cited

U.S. PATENT DOCUMENTS

| | | |
|---|---|---|
| 6,279,765 B1 | 8/2001 | Monaco |
| 6,290,038 B1 | 9/2001 | Jensen et al. |
| 6,311,962 B1 * | 11/2001 | Marking .................... 267/64.25 |
| 6,401,887 B1 | 6/2002 | Hur |
| 6,408,739 B1 | 6/2002 | Chamulak et al. |
| 6,443,437 B1 | 9/2002 | Beyene et al. |
| 6,698,730 B2 | 3/2004 | Easter |
| 7,617,792 B1 * | 11/2009 | Pursley .................... 114/219 |
| 8,356,807 B2 * | 1/2013 | Kerr et al. .................... 267/293 |
| 2004/0231936 A1 * | 11/2004 | Jacoby et al. ............ 188/322.19 |

* cited by examiner

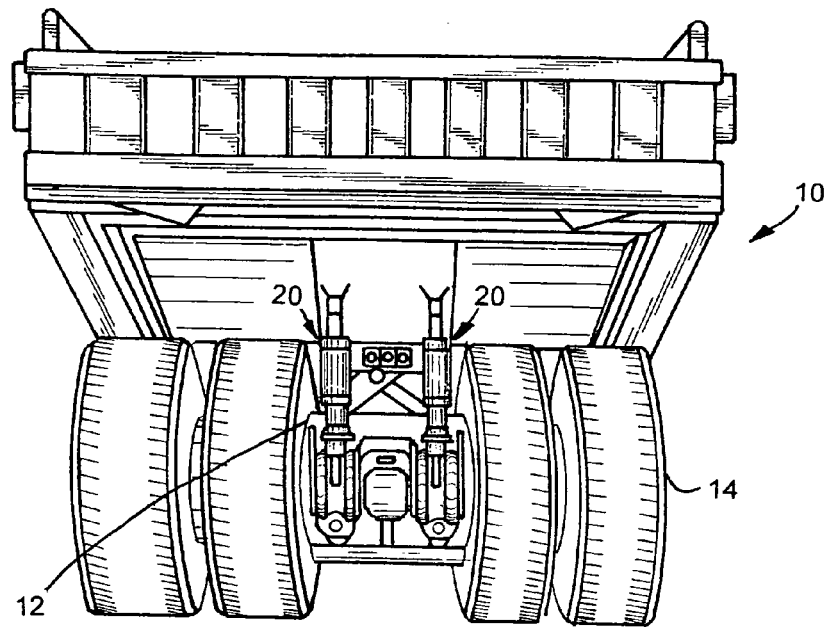
FIG. 1
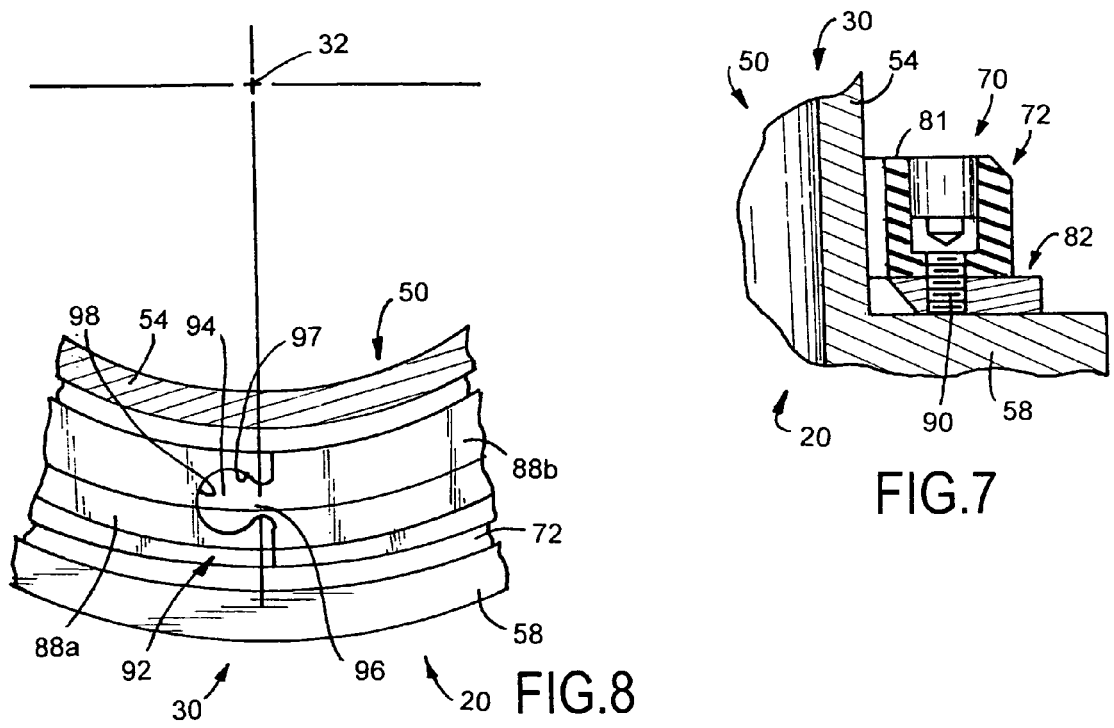
FIG. 7
FIG. 8

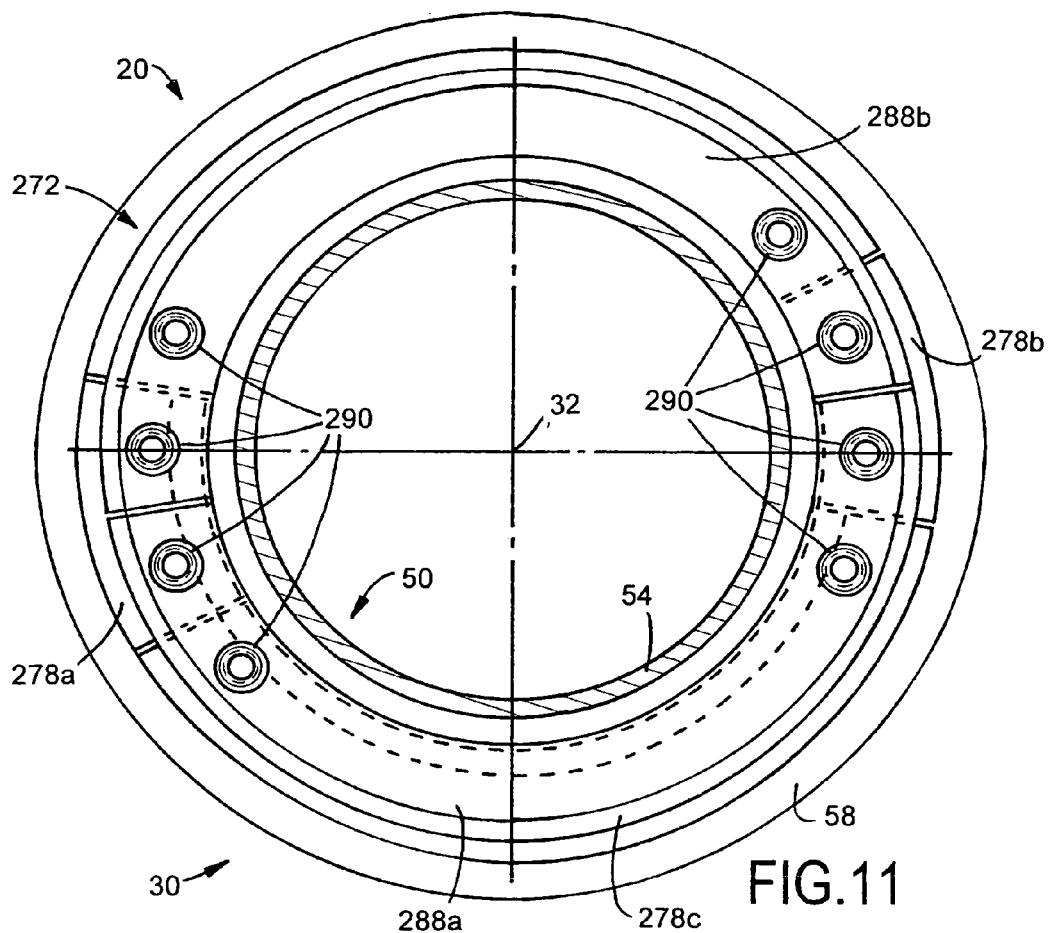
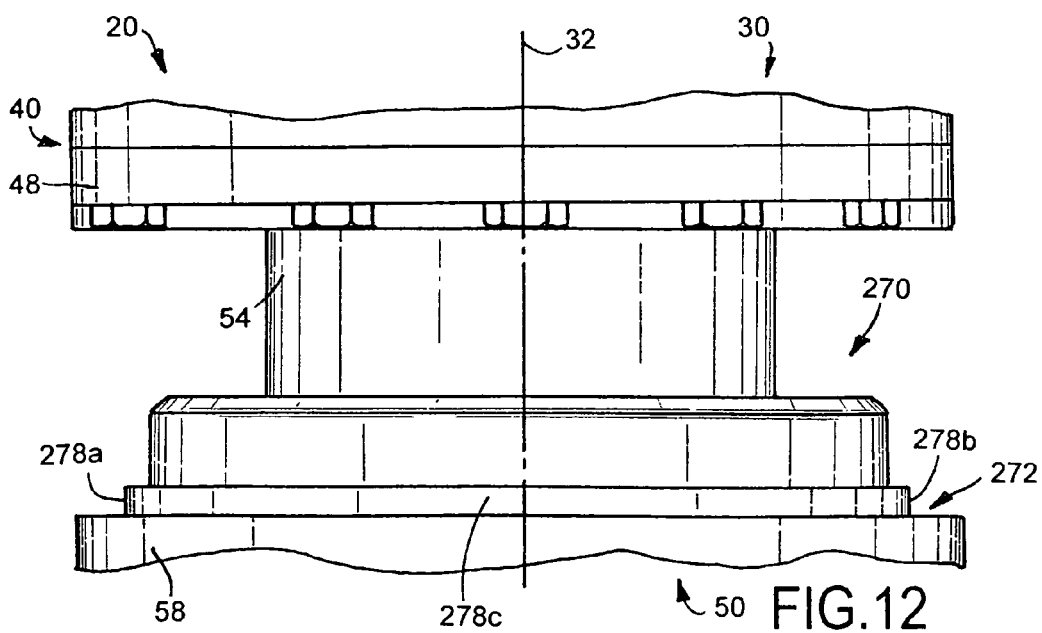

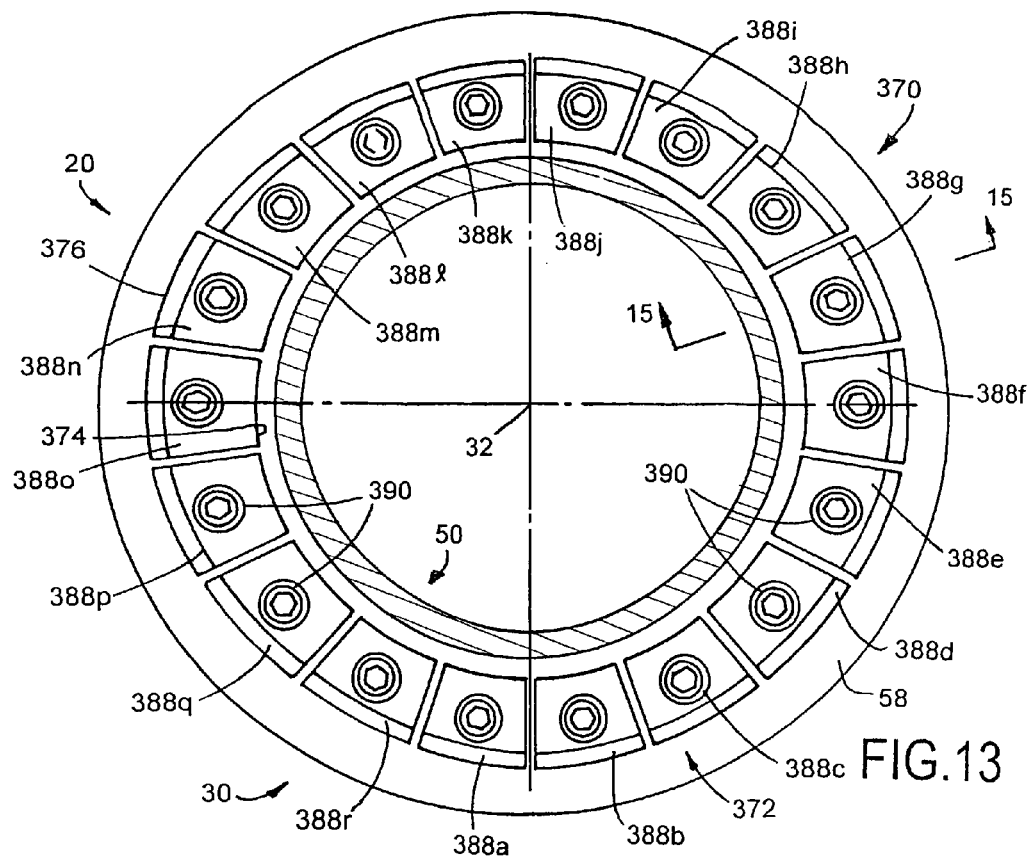
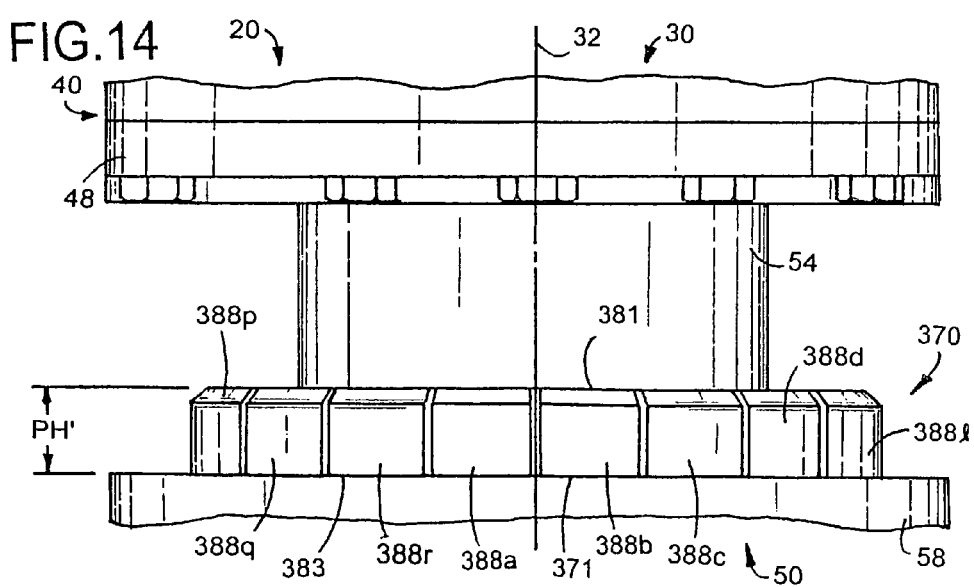

MULTIPIECE CUSHIONING ASSEMBLY FOR A TELESCOPING SHOCK ABSORBING ASSEMBLY

FIELD OF THE INVENTION DISCLOSURE

The present invention disclosure generally relates to a telescoping shock absorbing assembly and, more specifically, to a multipiece assembly used to cushion over-travel of the shock absorbing assembly and which is replaceable while maintaining individual housing members of the shock absorbing assembly in operable combination relative to each other.

BACKGROUND OF THE INVENTION DISCLOSURE

Various forms of telescopic shock absorbing assemblies are well known. Such shock absorbing assemblies typically include an outer housing and an inner housing arranged in generally coaxial and telescoping relation relative to each other. A spring or other form of pneumatic, fluid, and/or a combined pneumatic/fluid device is typically arranged internally of and in operable combination with the outer and inner housings for absorbing and returning energy imparted to the shock absorbing assembly.

Such telescoping shock absorbing assemblies are commonly used on heavy off-road vehicles and form part of the suspension system for such vehicle. In operation, a clevis is arranged toward an end of each housing for securing the shock absorbing assembly to different structural parts on the vehicle. In such vehicle suspension systems, the outer and inner housings of the shock absorber are each provided with a radial shoulder fixedly secured to and projecting radially outward from the respective housing. As known, the radial shoulders on the housings limit travel of the shock absorbing assembly and thereby protect the spring or other form of pneumatic and/or fluid device internally arranged within the shock absorbing assembly.

The shock absorbing assembly used as part of the suspension system for larger vehicles frequently includes an over-travel cushion or jounce bumper that slides over at least a portion of the shock absorber inner housing and is compressed between the radial shoulders on the outer and inner housings when normal travel of the shock absorber is exceeded. Largely because of the excessive loads applied thereto, these over-travel cushions or jounce bumpers can quickly become damaged during service of the shock absorbing assembly and, in many cases, break-off from about the shock absorbing assembly thereby eliminating any form of over-travel protection for the shock absorbing assembly.

Repair and/or replacement of such conventional over-travel cushions or jounce bumpers, especially when arranged in combination with a shock absorbing assembly used on a large heavy-duty off-road vehicle, is a time consuming and tedious process and cannot be accomplished while the shock absorbing assembly or strut remains on the vehicle. That is, replacement of the over-travel cushions or jounce bumpers requires complete removal of the shock absorbing assembly or strut from the vehicle. Thereafter, the inner and outer housings of the strut need to be axially separated from each other. Of course, and as will be appreciated by those skilled in the art, using pneumatics, fluids, and/or a pneumatic/fluid combination as a buffering device for the shock absorbing assembly severely complicates disassembly of the strut and is frequently dissuasive of the issue whether to effect replacement of the over-travel cushions or jounce bumpers.

Following replacement of the over-travel cushions or jounce bumpers, the inner and outer housings of the shock absorbing assembly need to be reassembled relative to each other. In those instances wherein the shock absorbing assembly uses pneumatics, fluids, and/or a pneumatic/fluid combination as a buffering device, and after the housings are reassembled relative to each other, the shock absorbing assembly needs to be again charged with the proper medium to effect the desired ends. Thereafter, the shock absorbing assembly is reinstalled and incorporated into the truck suspension system. Of course, and throughout the duration of this time consuming and tedious process, the vehicle remains out of service. For these and other reasons, and although offering beneficial over-travel protection to the shock absorbing assembly, the known over-travel cushions or jounce bumpers for shock absorbing assemblies are not replaced and/or repaired nearly as much as required or needed.

Thus, there is a need and continuing desire for a telescoping shock absorbing assembly which includes an over-travel cushion or jounce bumper for protecting the shock absorbing assembly or strut and which readily allows for repair and/or replacement of the over-travel cushion or jounce bumper while maintaining the inner and outer housings of the shock absorbing assembly in operable combination relative to each other.

SUMMARY

In view of the above, and in accordance with one aspect, there is provided in combination with a shock absorbing apparatus having a first member and a second housing member, and a new and novel over-travel cushioning assembly. The first member of the shock absorbing apparatus includes an outer housing with a radial shoulder fixedly arranged toward a first end of the outer housing and a connector arranged toward a second end of the outer housing. The second member of the shock absorber is axially aligned relative to and in operable combination with the first member. The second member has an axially elongated cylindrical extension extending from a first end such that the extension is telescopically movable within the outer housing of the first member. A radial shoulder is fixedly and axially spaced from the first end of the second member and a connector is arranged toward a second end of the second member. The radial shoulders on the first and second members limit axial travel of the shock absorbing apparatus. A device is arranged in operable combination with the first and second members for cushioning an axial load exerted to the shock absorbing apparatus.

The over-travel cushioning assembly is operably arranged between the radial shoulders on the first and second housings and includes a carrier and a multipiece cushion. The carrier is arranged about the axially elongated extension on the second member and between the radial shoulders on said first and second members. The multipiece cushion is arranged in operable combination with the carrier between the radial shoulders on said first and second members for absorbing over-travel of said first and second members relative to each other. The multipiece cushion includes at least two elastomeric bumpers releasably connected to the carrier so as to permit replacement of the multipiece cushion while maintaining the first and second members of the shock absorbing apparatus in operable combination relative to each other.

Preferably, each elastomeric bumper of the cushioning assembly has a Shore D durometer hardness ranging between about 40 and 55. In one embodiment, the elastomeric bumpers of the cushioning assembly define between about 60% and about 85% of an overall thickness of the cushioning assembly.

In a preferred embodiment, each elastomeric bumper of the cushioning assembly has a generally semi-circular configuration, in plan, with opposed ends of each elastomeric bumper being interconnected to each other. In one form, an inner diameter of each elastomeric bumper of the cushioning assembly is larger than the axially elongated cylindrical extension on the second member, and an outer diameter of each elastomeric bumper is slightly less than a diameter of the carrier.

In another embodiment, the carrier of the cushioning assembly includes plural segments which together form a ring. In this embodiment, each segment of the carrier has a generally semi-circular configuration, in plan, with the segments of the carrier being radially offset relative to the elastomeric bumpers by about 90 degrees.

According to another embodiment, there is provided a shock absorbing apparatus defining an elongated central axis and having first and second members arranged in telescopic relation relative to each other and an over-travel multipiece cushioning assembly. The first member of the shock absorbing apparatus includes an outer housing having a radial shoulder fixedly arranged toward one end thereof. The second member of the shock absorbing apparatus is axially aligned relative to and in operable combination with the first member. The second member has an axially elongated cylindrical extension telescopically movable within the outer housing of the first member and a radial shoulder axially and fixedly spaced from a first end thereof. The radial shoulders on the first and second members limit axial travel of the shock absorbing apparatus. A device is arranged in operable combination with the first and second members for cushioning an axial load exerted on the apparatus.

The multipiece cushioning assembly is operably arranged between the radial shoulders on the first and second members. The multipiece cushioning assembly includes a series of bumpers which together provide a circular array of bumpers arranged about the axially elongated cylindrical extension on the second member and between the radial shoulders on the first and second members for absorbing over-travel of the first and second members relative to each other. The bumpers are releasably interconnected to each other so as to permit replacement of the multipiece cushion assembly while maintaining the first and second members of the shock absorbing apparatus in operable combination relative to each other.

Preferably, each elastomeric bumper of the multipiece cushioning assembly has a Shore D durometer hardness ranging between about 40 and 55. In one form, the elastomeric bumpers of the cushioning assembly define between about 60% and about 85% of an overall thickness of the cushioning assembly. In one embodiment, each elastomeric bumper of the cushioning assembly has a generally semi-circular configuration, in plan, with opposed ends of each elastomeric bumper being interconnected to each other. Preferably, the inner diameter of each elastomeric bumper of the multipiece cushioning assembly is larger than the axially elongated cylindrical extension on the second member, and an outer diameter of each elastomeric bumper is slightly less than a diameter of either radial shoulder on the first and second members.

In a preferred embodiment, the multipiece cushioning assembly further includes plural carrier segments which interconnect juxtaposed ends of radially adjacent elastomeric bumpers to each other. In another form, each elastomeric bumper of the multipiece cushioning assembly has a series of radially adjacent lugs on at least one face thereof.

According to another aspect, there is provided a shock absorbing apparatus including first and second members arranged in telescopic relation relative to each other and an assembly for cushioning over-travel of the first and second members relative to each other. The first member of the shock absorbing apparatus has an outer housing with a radial shoulder fixedly arranged toward one end thereof. The second member of the shock absorbing apparatus is axially aligned relative to and in operable combination with the first member. The second member has an axially elongated extension telescopically movable within the outer housing of the first member and a radial shoulder axially and fixedly spaced from a first end of the second member. The radial shoulders on the first and second members limit axial travel of the shock absorbing apparatus. A cushioning device is arranged in operable combination with the first and second members for absorbing an axial load exerted on the shock absorbing apparatus.

The cushioning assembly is operably arranged between the radial shoulders on the first and second members and includes a series of individual elastomeric bumpers which together provide a circular array of bumpers arranged about the axially elongated extension on the second member for absorbing over-travel of said first and second members relative to each other. The elastomeric bumpers permit replacement of the cushioning assembly while maintaining the first and second members in operable combination relative to each other.

In this family of embodiments, each elastomeric bumper of the cushioning assembly preferably has a Shore D durometer hardness ranging between about 40 and 55. Moreover, the elastomeric bumpers of the cushioning assembly can be individually fastened to the radial shoulder of the second member. Alternatively, the cushioning assembly further includes plural carrier segments which interconnect juxtaposed ends of radially adjacent elastomeric bumpers to each other. In another form, each elastomeric bumper of the cushioning assembly has a series of radially adjacent lugs on at least one face thereof.

In yet another form, each elastomeric bumper of the cushioning assembly has a generally semi-circular configuration, in plan, with opposed ends of each elastomeric bumper being interconnected to each other. An inner diameter of each elastomeric bumper of the cushioning assembly is preferably larger than the axially elongated extension on the second member, and an outer diameter of each elastomeric bumper is preferably slightly less than a diameter of either radial shoulder on the first and second members.

According to another family of embodiments, there is provided a multipiece cushioning assembly adapted to be arranged in combination with a shock absorbing apparatus. The multipiece cushioning assembly is disposed between a pair of radial shoulders on first and second members telescoping members of the shock absorbing apparatus arranged in operable combination relative to each other. The radial shoulders on the first and second members limit travel of the shock absorbing apparatus, and with said multipiece cushioning assembly including a plurality of interconnected bumpers arranged in a generally circular array for absorbing over-travel of the first and second members relative to each other and for readily permitting replacement of the multipiece cushioning assembly while maintaining the first and second members in operable combination relative to each other.

In this family of embodiments, each elastomeric bumper of the multipiece cushioning assembly preferably has a Shore D durometer hardness ranging between about 40 and 55. Moreover, and in this embodiment, the elastomeric bumpers of the cushioning assembly define between about 60% and about 85% of an overall thickness of the cushioning assembly.

Preferably, the multipiece cushioning assembly further includes plural carrier segments which interconnect juxtaposed ends of radially adjacent elastomeric bumpers to each other. In one form, each elastomeric bumper of the multipiece cushioning assembly has a generally semi-circular configuration, in plan. In one embodiment, an inner diameter of each elastomeric bumper is larger than in an inside diameter of the radial shoulder on the second member, and an outer diameter of each elastomeric bumper is slightly less than an outer diameter of either radial shoulder on the first and second members. Preferably, each carrier segment of the multipiece cushioning assembly has a generally semi-circular configuration, in plan, with the carrier segments being radially offset relative to the elastomeric bumpers by about 90 degrees. In another embodiment, each elastomeric bumper of the multipiece cushioning assembly has a series of radially adjacent lugs on at least one face thereof.

BRIEF DESCRIPTION OF THE DRAWINGS

FIG. 1 is a rear view of a heavy off-road vehicle showing a suspension system including at least two shock absorbing mechanisms which embody principals and teachings of this invention disclosure;

FIG. 7 is an enlarged sectional view taken along line 7-7 of FIG. 5;

FIG. 8 is a fragmentary and enlarged top plan view of alternative structure arranged as part of and in operable combination with the multipiece cushioning assembly;

FIG. 11 is an enlarged top plan view, similar to FIG. 5, illustrating another alternative embodiment of the multipiece cushioning assembly;

FIG. 12 is a fragmentary and enlarged elevational view of the multipiece cushioning assembly illustrated in FIG. 11;

FIG. 13 is an enlarged top plan view, similar to FIG. 5, illustrating yet another alternative embodiment of the multipiece cushioning assembly;

FIG. 14 is a fragmentary and enlarged elevational view of the multipiece cushioning assembly illustrated in FIG. 13.

DETAILED DESCRIPTION

Figure 2:
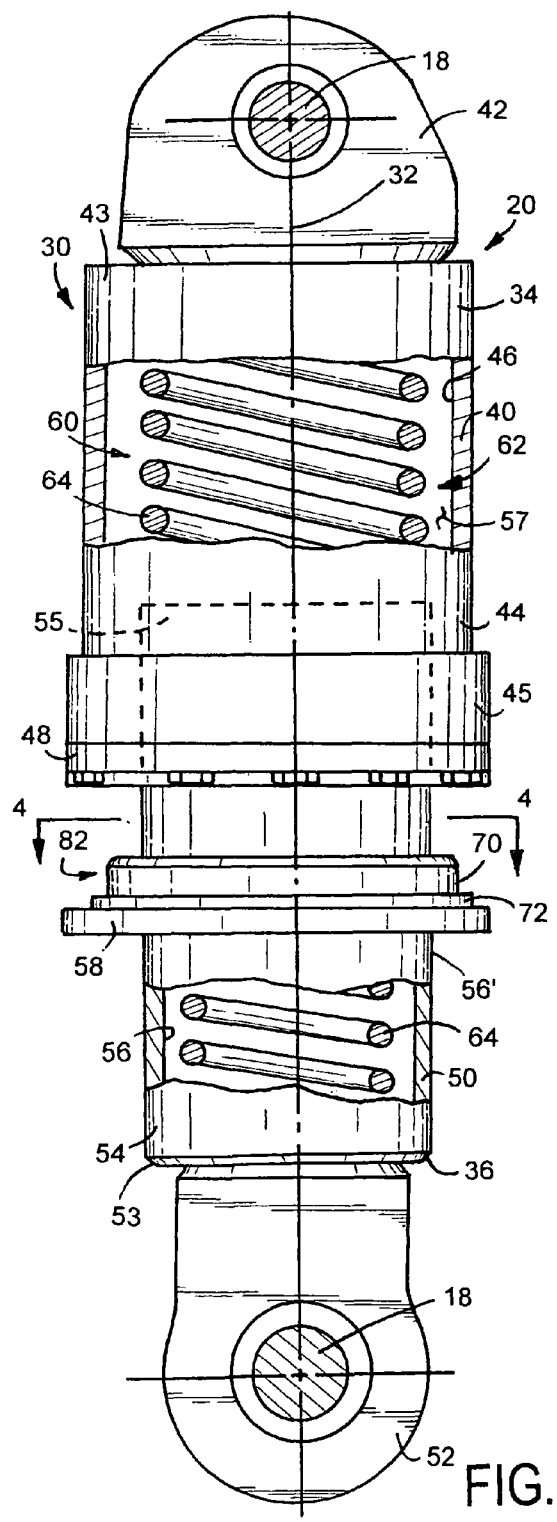
FIG. 2 is an enlarged elevational view of one form of shock absorbing apparatus embodying principals and teachings of this invention disclosure.

While this invention disclosure is susceptible of embodiment in multiple forms, there is shown in the drawings and will hereinafter be described preferred embodiments, with the understanding the present disclosure sets forth exemplifications of the disclosure which are not intended to limit the disclosure to the specific embodiments illustrated and described.

Referring now to the drawings, wherein like reference numerals indicate like parts throughout the several views, there is shown in FIG. 1 a heavy off-road self-propelled vehicle capable of carrying and transporting cargo in the range of 30 to 300 tons. Such vehicle is generally identified by reference numeral 10 and essentially includes two groups of components. The first is the main frame 12 which includes generally the frame, the cab, engine, and etc. The other main component 14 includes the axle system, tires, drive mechanism, and etc. Between these two main groups of components is a suspension system including, toward a rear of the vehicle, at least two shock absorbing mechanisms 20. For all practical purposes, the shock absorbing mechanisms 20 are essentially the same and, therefore, discussion will be limited to one shock absorbing apparatus or mechanism, with the understanding that it applies to the other shock absorbing apparatus arranged toward the rear of vehicle 10.

Although shown in operable combination with a suspension system on a heavy off-road vehicle, it should be appreciated the teachings and principals of this invention disclosure equally apply to use of a shock absorbing apparatus used in different environments other than that shown for exemplary purposes. For example, the present disclosure is equally applicable to and can be readily used in combination with a shock absorbing apparatus used on or with other off-highway vehicles, i.e., trailers, trucks, certain automotive applications, and underground mining vehicles.

Figure 3:
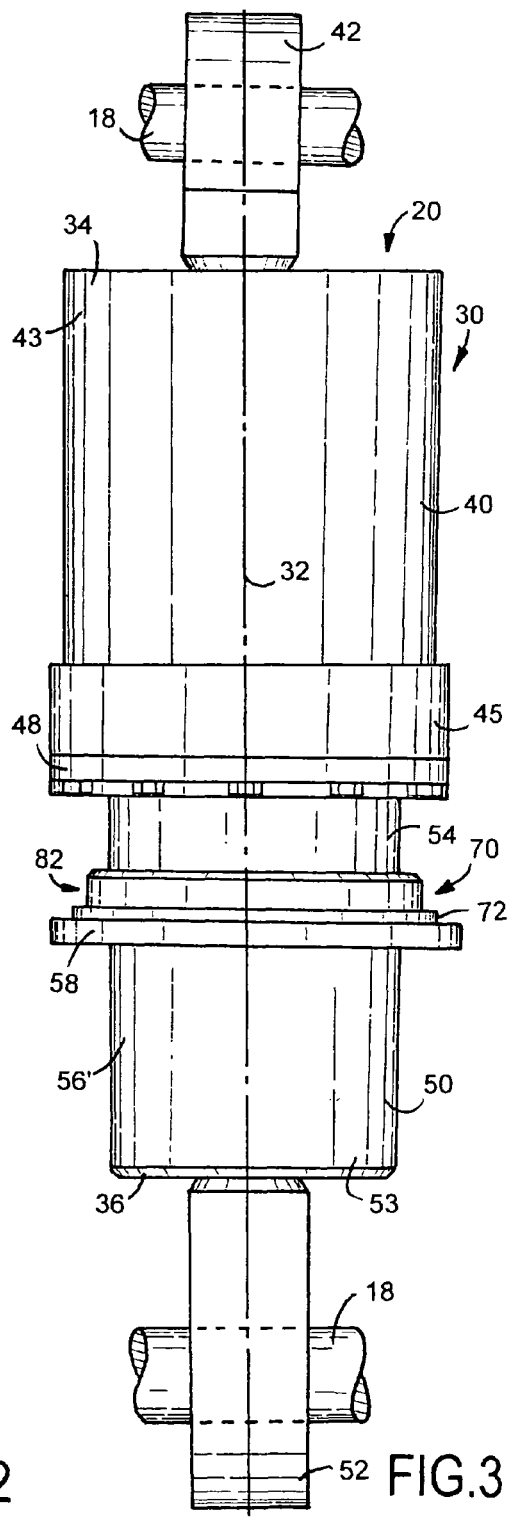
FIG. 3 is another enlarged elevational view of the shock absorbing apparatus illustrated in FIG. 2.

Turning to FIGS. 2 and 3, each shock absorbing apparatus 20 includes an axially elongated multipiece housing 30 defining a longitudinal axis 32 extending between first and second ends 34 and 36, respectively. The multipiece housing 30 includes a first or outer axially elongated member 40 and a second or inner axially elongated member 50. In a preferred form, each housing member 40, 50 each has a generally cylindrical configuration. Lengthwise portions of the housing members 40 and 50 are slidably arranged, at least partially, in telescopic relation relative to each other.

As shown in FIGS. 2 and 3, and toward one end thereof, housing member 40 preferably includes a connector or structure 42 for pivotally or articulately securing one end 34 of shock absorbing apparatus 20 to one group of components on the vehicle 10 (FIG. 1). As shown in FIGS. 2 and 3, and toward one end thereof, housing member 50 preferably includes a connector or structure 52 for pivotally or articulately securing the second end 36 of the shock absorbing apparatus 20 to another group of components on the vehicle 10 (FIG. 1). Structures 42 and 52 can be of any suitable design and construction from that shown without detracting or departing from the spirit and scope of the invention disclosure. Moreover, any suitable means can be employed, and in the example illustrated in FIGS. 2 and 3, a pin 18 is used to operably interconnect ends 34 and 36 of the shock absorbing apparatus 20 to the vehicle 10 (FIG. 1).

Housing member 40 has a closed end 43 and an axially aligned open end 45 with a hollow body portion 44 extending therebetween. In the illustrated embodiment, the hollow body portion 44 of member 40 has a generally cylindrical outer surface configuration. The closed end 43 and body portion 44 of member 40 combine to define a blind cavity 46 opening only to the open end 45 of housing member 40. In the illustrated embodiment, and between the open and closed ends thereof, the blind cavity 46 has a generally cylindrical configuration. As shown, the structure 42 for facilitating connection of the shock absorbing apparatus 20 to vehicle 10 (FIG. 1) is operably carried toward the closed end 43 of housing member 40.

Housing member 50 has a closed end 53 and an axially aligned open end 55 with an axially elongated hollow body portion 54 extending therebetween. In the embodiment illustrated by way of example, the axially elongated body portion of extension of housing member has a generally cylindrical outer configuration and defines, in the illustrated form, a generally cylindrical blind cavity 56 opening only to an open end 55 of housing member 50. The body portion or extension 54 of housing member 50 extends away from end 55 and toward end 53. The body portion 54 of housing member 50 preferably has a relatively high surface finish on the exterior surface 56' thereof.

In the preferred form, lengthwise portions of the body portions 44 and 54 of housing members 40 and 50, respectively, are arranged in telescopic sliding relation relative to each other such that the cavities 46 and 56 of the housing members 40 and 50, respectively, combine to define a closed space 57 within housing 30. In the illustrated embodiment, the structure 52 for facilitating connection of the shock absorbing apparatus 20 to the vehicle 10 (FIG. 1) is operably carried toward the closed end 53 of housing member 50. Preferably, each shock absorbing apparatus 20 furthermore includes conventional structure (not shown) for effecting guidance and alignment between those axial lengthwise portions of the housing members 40 and 50 arranged in generally telescopic relation relative to each other.

Toward end 45, housing 40 is furthermore provided with a rigid radial shoulder 48 extending outwardly from the outer surface of the body portion 44. In the illustrated embodiment, housing 50 of apparatus 20 is also provided with a rigid radial shoulder 58 which is axially spaced from end 55 and extends outwardly from the outer surface of the body portion 54. When the shock absorbing apparatus 20 is operated under normal conditions, and as shown by way of example in FIGS. 2 and 3, the radial shoulders 48 and 58 on members 40 and 50, respectively, are axially spaced or separated from each other.

The axial spacing between the radial shoulders 48 and 58 on housing members 40 and 50, respectively, defines the operational travel of the shock absorbing apparatus 20. When an unusually high or unusually heavy compressive axial load is imparted to the shock absorbing apparatus 20, as for example when vehicle 10 hits a bump or other sharply rising elevation in the surface being traversed by vehicle 10, or when the shock absorbing apparatus 20 loses sufficient gas volume, the radial shoulders 48 and 58 of housing members 40 and 50 are configured and designed to limit over-travel of the shock absorbing apparatus 20.

The shock absorbing apparatus 20 furthermore includes a device 60 arranged internally of and in operable combination with the first and second members 40 and 50, respectively, for maintaining the radial shoulders 48 and 58 on members 40 and 50, respectively, in resiliently biased and axially spaced relation relative to each other and for cushioning axial loads exerted on apparatus 20. Device 60 can take any of a myriad of different designs, i.e., steel springs, elastic springs, hydraulics, pneumatics, hydraulic and pneumatic combination, and etc. without detracting or departing from the true spirit and scope of this invention disclosure.

In the embodiment illustrated by way of example in FIG. 2, device 60 includes an axially elongated spring assembly 62 arranged in operable combination with the housing members 40 and 50 of apparatus 20. In the illustrated embodiment, spring assembly 62 is arranged within the closed space 57 defined by housing members 40 and 50 and includes an axially elongated steel spring 64 for absorbing, dissipating and returning energy imparted or axially applied to the shock absorbing apparatus 20. In the illustrated embodiment, and after apparatus 20 is assembled and is arranged in operable combination with vehicle 10 (FIG. 1), one end of spring assembly 62 acts against the closed end 43 of housing member 40. A second end of spring assembly 62 acts against the closed end 53 of housing member 40.

As shown in FIGS. 2 and 3, a cushioning assembly 70 is operably arranged between the radial shoulders 48 and 58 on the housing members 40 and 50, respectively, of apparatus 20 for cushioning over-travel of the housing members 40 and 50 during operation of apparatus 20. In the embodiment illustrated in FIGS. 2, 3 and 4, the cushioning assembly 70 includes a carrier 72 and a multipiece cushion 82 arranged in operable combination with carrier 72.

In the embodiment illustrated in FIGS. 2, 3, 5 and 6, carrier 72 is arranged about the axially elongated extension or body portion 54 of the second member 50 of apparatus 20 between the radial shoulders 48 and 58 on the first and second housing members 40 and 50, respectively, of apparatus 20. To add structural rigidity and stiffness to the cushioning assembly 70, carrier 72 is preferably formed from a suitably rigid metal, i.e., steel or the like, and has a ring-like design. As such, and as illustrated for example in FIG. 5, carrier 72 is provided with an inner diameter 74 which, in one embodiment, is preferably larger than the outer diameter of the axially elongated extension or body portion 54 of the second member 50 of apparatus 20, and an outer diameter 76 which, in one embodiment, is smaller than the outer of the radial shoulder 58 on housing member 50 of apparatus 20. Configuring the carrier or ring 72 from metal advantageously inhibits excessive radial expansion when the cushioning assembly 70 is squeezed or otherwise compressed between the radial shoulders 48 and 58 (FIG. 6) upon over-travel of the housing members 40 and 50, respectively, during operation of apparatus 20.

In a preferred form shown in FIGS. 4 and 5, and for reasons discussed below, carrier 72 is comprised of plural and generally planar segments 78a and 78b which together form ring 72. In one embodiment, the segments 78a and 78b of the carrier 72 are generally identical relative to each other and each segment 78a and 78b has a generally semi-circular configuration, in plan.

In one form, the multipiece cushion 82 is mounted on and carried by carrier 72 for absorbing over-travel of the first and second housing members 40 and 50, respectively, of apparatus 20. Like carrier 72, and as shown in FIGS. 2, 3 and 6, cushion 82 is arranged about the axially elongated extension or body portion 54 of the second member 50 of apparatus 20 between the radial shoulders 48 and 58 on the housing members 40 and 50, respectively, of apparatus 20. Turning again to the embodiment illustrated by way of example in FIG. 5, cushion 82 also has a ring-like design and is provided with an inner diameter 84 which, in one embodiment, is preferably larger than the outer diameter of the axially elongated extension or body portion 54 of the second member 50 of apparatus 20, and an outer diameter 86 which, in one embodiment, is generally equal to or smaller than the outer diameter 76 of carrier 72.

In a preferred embodiment, cushion 82 includes two elastomeric cushions or bumpers 88a and 88b releasably connected to the carrier 72. Forming the cushion 82 from multiple elastomeric pieces 88a and 88b yields several benefits. First, forming cushion 82 from multiple pieces 88a and 88b readily, quickly and advantageously permits replacement of the cushion 82 from about the axially elongated extension or body portion 54 of the second member 50 of apparatus 20. Second, forming cushion 82 from multiple pieces 88a and 88b readily, quickly and advantageously permits replacement of the cushion 82 from between the radial shoulders 48 and 58 on housing members 40 and 50, respectively, of apparatus 20 (FIGS. 2, 3 and 6).

Also, forming cushion 82 from multiple pieces 88a and 88b readily, quickly and advantageously permits replacement of the cushion 82 while maintaining the first and second housing members 40 and 50, respectively, of apparatus 20 (FIG. 4) in operable combination relative to each other. That is, the present invention disclosure readily permits repair and/or replacement of the cushion 82 without having to disassemble apparatus 20 thus saving an enormous amount of time and effort while significantly reducing the time the vehicle on which apparatus 20 is arranged in operable combination remains out of service as a result of having to repair and/or replace the multipiece cushioning assembly 70.

Figure 4:
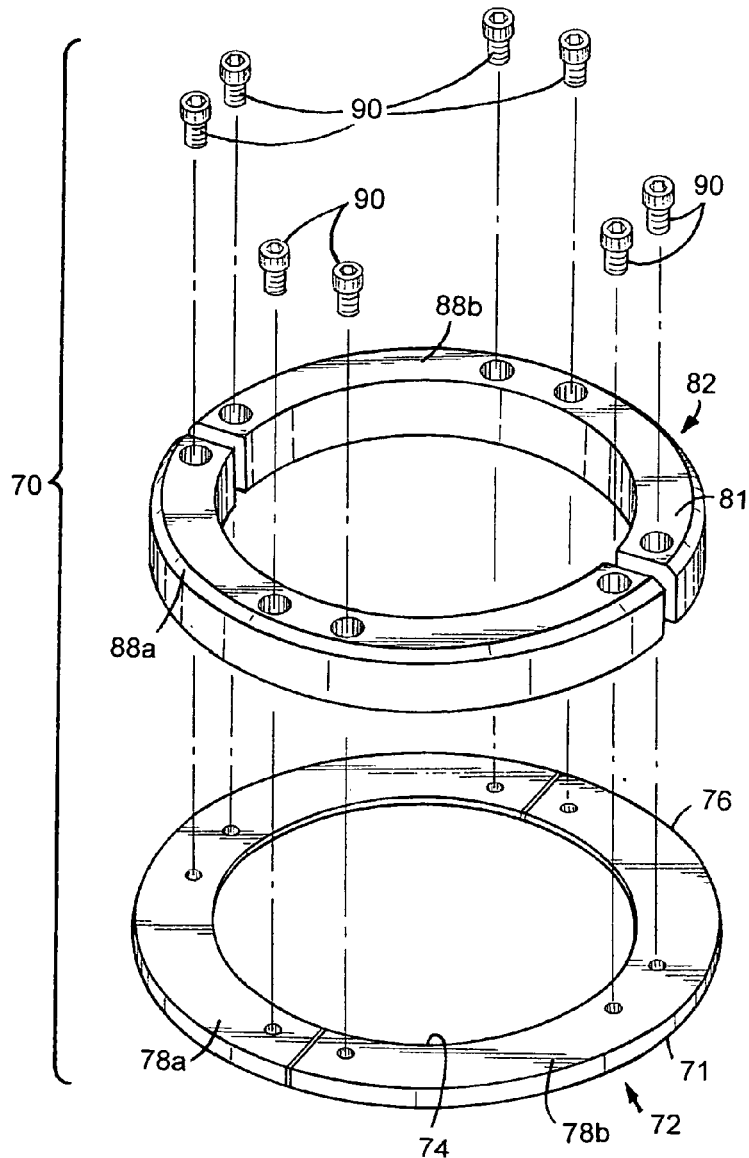
FIG. 4 is a perspective view of one form of multipiece cushioning assembly embodying principals and teachings of this invention disclosure.
Figure 5:
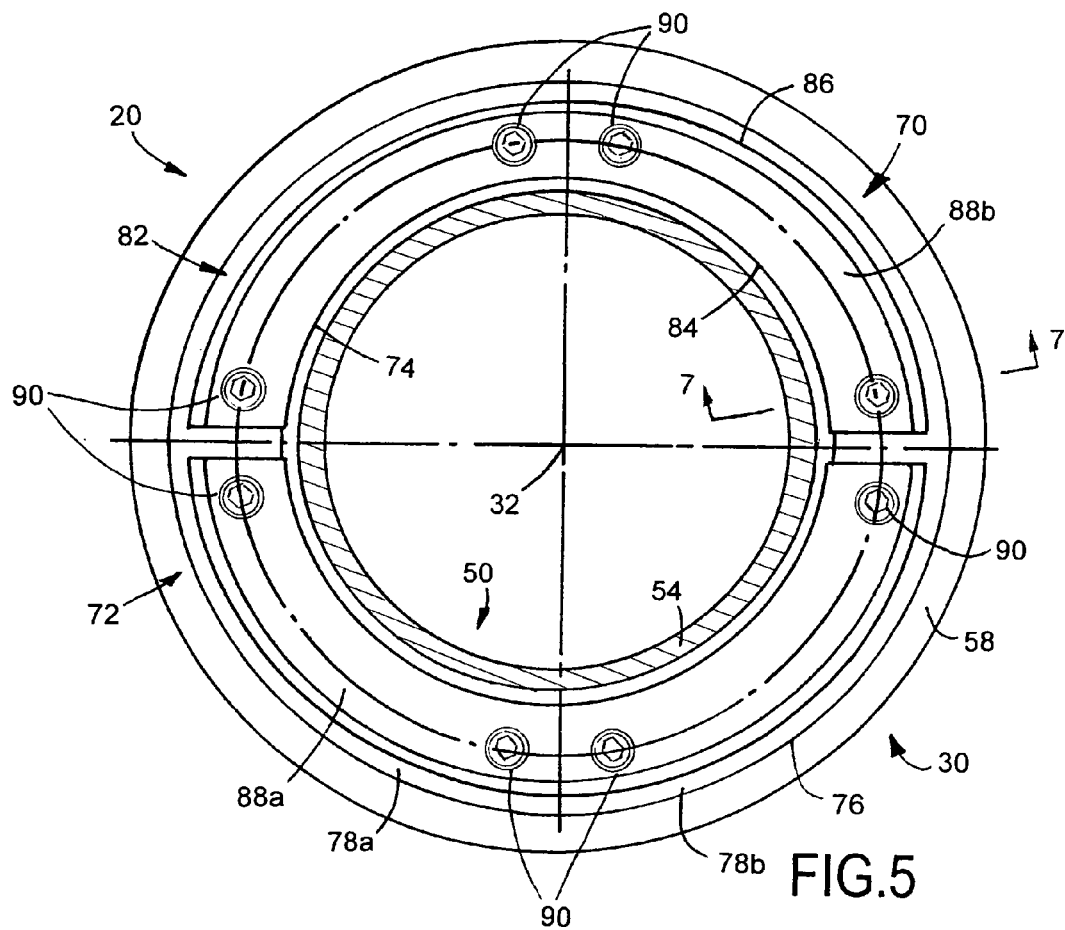
FIG. 5 is an enlarged top plan view of one form of multipiece cushioning assembly taken along line 5-5 of FIG. 2.
Figure 6:
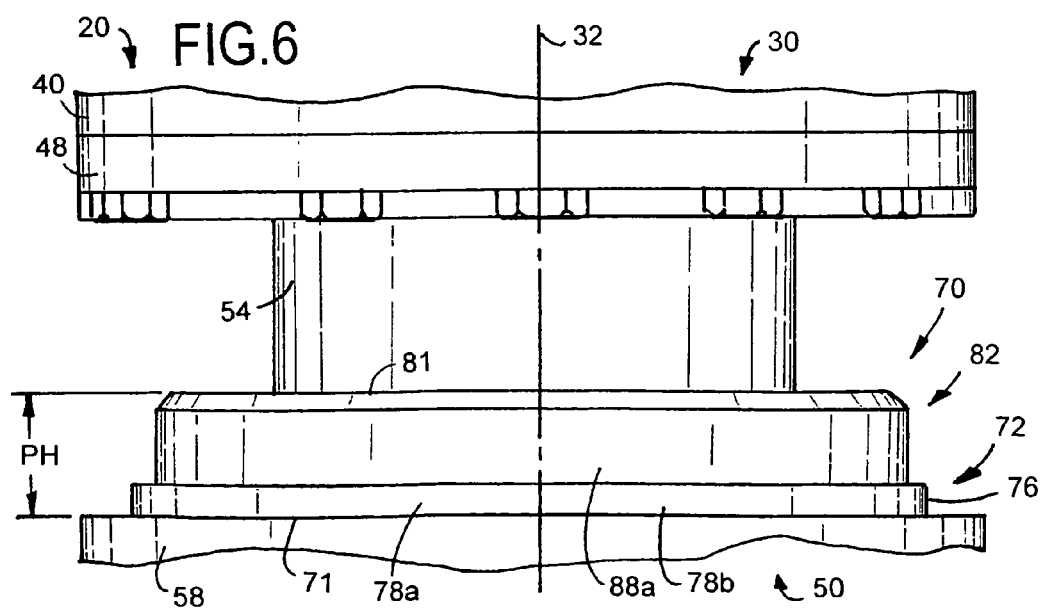
FIG. 6 is a fragmentary and enlarged elevational view of the multipiece cushioning assembly shown in FIGS. 4 and 5 arranged on the shock absorbing apparatus.

In the embodiment illustrated in FIGS. 4 and 5, the bumpers 88a and 88b forming cushion 82 are substantially identical to each other. Almost any elastomer, .i.e. rubber, nylon, urethane, plastics, composites, a HYTREL® type material sold by DuPont Corporation, and other like elastomers can be used to form bumpers 88a and 88b. Preferably, however, the elastomer used to form bumpers 88a and 88b has a Shore D durometer hardness ranging between about 40 and 55.

As shown in FIG. 6, when bumpers 88a and 88b are releasably connected to the carrier 72, cushioning assembly 70 has an overall non-compressed and predetermined height PH between a lowermost surface 71 on carrier 72 and an uppermost surface 81 on the bumpers. Preferably, the bumpers 88a and 88 define between about 60% to about 85% of the overall non-compressed predetermined height PH of the cushioning assembly 70. When used in operable combination with a heavy off-road self-propelled vehicle capable of carrying and transporting cargo in the range of 30 to 300 tons, the overall non-compressed and predetermined height PH of cushioning assembly preferably ranges between about 1.85 inches and about 2.5 inches. In a most preferred form, and when used in operable combination with a heavy off-road vehicle capable of carrying and transporting cargo in the range of 30 to 300 tons, the overall non-compressed and predetermined height PH of cushioning assembly 70 is about 2.0 inches.

In one form, each bumper 88a and 88b has a generally semi-circular configuration, in plan, and when secured to carrier 72 form a ring about the axially elongated extension or body portion 54 of the second member 30 of apparatus 20. In one embodiment, and as shown in FIGS. 4 and 7, bumpers 88a and 88b are preferably connected to the carrier 72 using conventional headed fasteners 90 which threadably engage with carrier 72. As shown in FIG. 7, the head of each fastener 90 is recessed from the uppermost surface 81 of each bumper 88a and 88b.

When releasably secured to the carrier 72 and, as shown in FIG. 5, the opposed ends of the bumpers 88a and 88b are arranged in generally juxtaposed relation relative to each other. Moreover, and shown on FIGS. 4 and 5, when the bumpers 88a and 88b are secured to the carrier 72, the segments 78a and 78b forming carrier 72 are radially offset relative to the bumpers 88a and 88b by about 90 degrees.

Forming the carrier 72 from multiple segments 78a and 78b also yields advantages. Primarily, forming carrier 72 from segments 78a and 78b, readily, quickly and advantageously permits replacement of the entire cushioning assembly 70 from about the axially elongated extension or body portion 54 of the second member 30 of apparatus 20 while maintaining the first and second housing members 40 and 50, respectively, of apparatus 20 (FIG. 4) in operable combination relative to each other. That is, the present invention disclosure readily permits both repair and/or replacement of the carrier 72 and multipiece cushion 82 without having to disassemble apparatus 20 thus saving both time and effort while significantly reducing the time the vehicle on which apparatus 20 is arranged in operable combination remains out of service as a result of having to repair and/or replace cushioning assembly 70.

FIG. 8 illustrates one example of structure 92 for releasably maintaining opposed and juxtaposed ends of the bumpers or cushions 88a and 88 in operable combination relative to each other. In the example illustrated in FIG. 8, structure 92 includes an enlarged head or projection 94 extending away from a free end of bumper 88b and joined to bumper 88b by a narrowed neck portion 96. The enlarged head or projection 94 on bumper 88a is accommodated in a suitably sized opening 98 provided at the juxtaposed free end of bumper 88a. As shown, the marginal edge 97 of opening 98 extends about and encircles a majority of the outer circumference of head 94 and extends inwardly toward the neck portion 96 on bumper 88b. Suffice it to say, structure 92 is suitably configured as to allow for vertical insertion of the head or projection 94 on bumper 88b into the opening 98 provided at the juxtaposed free end of bumper 88a while inhibiting radial separation between the juxtaposed ends of the bumpers 88a and 88b. Alternatively, a dove-tail configured joint or other form of interconnecting instrumentality would equally suffice for releasably maintaining opposed and juxtaposed ends of the bumpers or cushions 88a and 88b in operable combination relative to each other.

Without detracting or departing from the true spirit and scope of this invention disclosure, the arrangement or positioning of the elements comprising structure 92 can be readily reversed. That is, at the opposed ends of the bumpers 88a and 88b, the enlarged head or projection 94 of structure 92 can extend from a free end of bumper 88a and is joined to bumper 88b by a narrowed neck portion 96. In this form, the enlarged head or projection 94 on bumper 88a can be accommodated in a suitably sized opening 98 provided at the juxtaposed free end of bumper 88b for releasably maintaining the juxtaposed ends at the opposed ends of the bumpers or cushions 88a and 88b in operable combination relative to each other.

Figure 9:
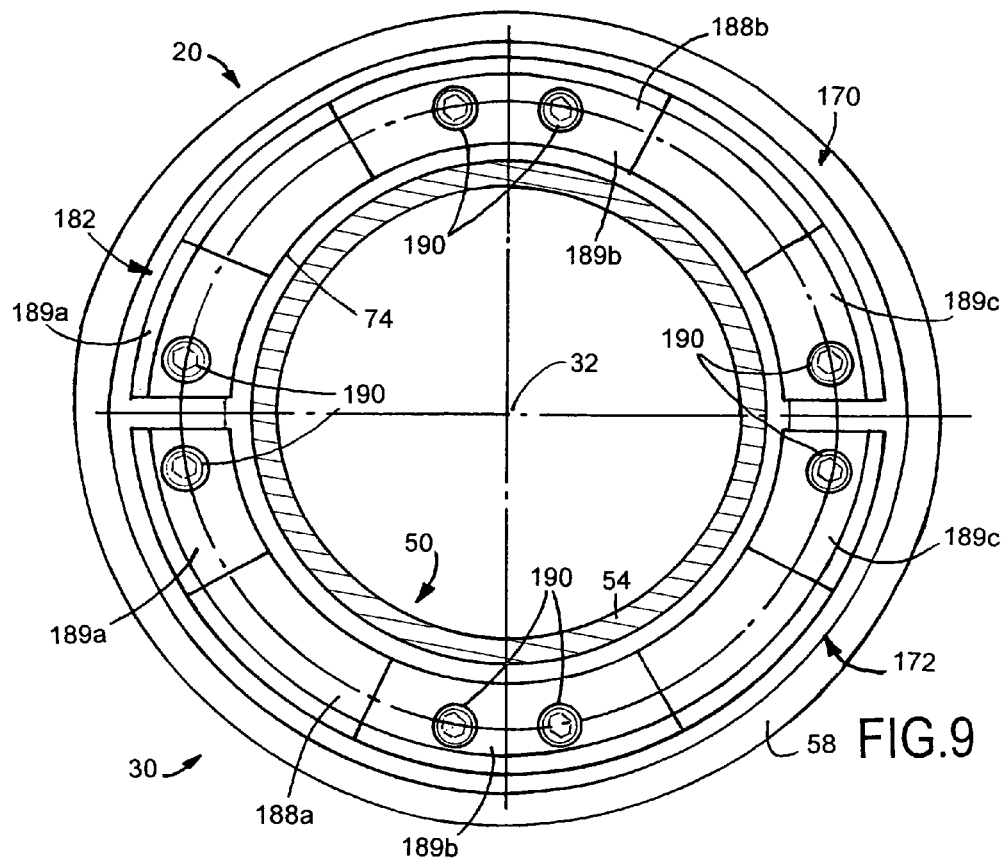
FIG. 9 is an enlarged top plan view, similar to FIG. 5, illustrating an alternative embodiment of the multipiece cushioning assembly.
Figure 10:
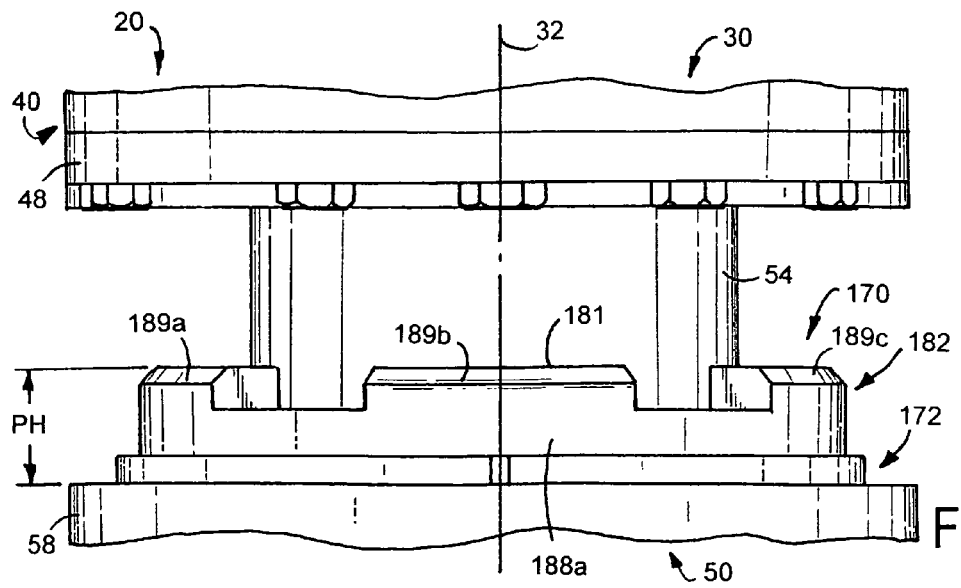
FIG. 10 is a fragmentary and enlarged elevational view of the multipiece cushioning assembly illustrated in FIG. 9.

FIGS. 9 and 10 illustrate an alternative example or design for the cushioning assembly of the present invention disclosure. This alternative form of cushioning assembly is designated generally by reference numeral 170. The elements of this alternative cushioning assembly that are functionally analogous to those components discussed above regarding cushioning assembly 70 are designated by reference numerals identical to those listed above with the exception this embodiment uses reference numerals in the 100 series.

Cushioning assembly 170 is operably arranged between the radial shoulders 48 and 58 on the first and second housing members 40 and 50, respectively, of apparatus 20 (FIG. 10) for cushioning over-travel of the housing members 40 and 50 during operation of apparatus 20. In the embodiment illustrated in FIGS. 9 and 10, the cushioning assembly 170 includes a carrier 172 and multipiece cushion 182 arranged in operable combination with carrier 172.

Carrier 172 is substantially similar to carrier 72 discussed above. Moreover, cushion 182 includes two elastomeric cushions or bumpers 188a and 188b releasably connected to the carrier 172 by a series of fasteners 190 similar to fasteners 90 discussed above. In this embodiment, the bumpers 188a and 188b are substantially identical relative to each other. The bumpers 188a and 188b of cushion 182 are preferably formed from almost any elastomer, .i.e. rubber, nylon, urethane, plastics, composites, a HYTREL® type material sold by DuPont Corporation, and other like elastomers. Preferably, however, the elastomer used to form bumpers 188a and 188b has a Shore D durometer hardness ranging between about 40 and 55.

Each bumper 188a and 188b forming cushion 172 has a series a radial lugs 189a, 189b and 189c on at least one face 181 thereof. In the embodiment shown in FIG. 10, each lug 189a, 189b and 189c has a vertical height defining between about 15% and about 35% of he overall predetermined height PH of the cushioning assembly 170. The lugs 189a, 189b and 189c about each lug 188a and 188b advantageously yield a different level of load absorption for the cushioning assembly 170 depending upon the extent of over-travel of the housing members 40 and 50 during operation of the cushioning apparatus 20.

FIGS. 11 and 12 illustrate another alternative example or design for the cushioning assembly of the present invention disclosure. This alternative form of cushioning assembly is designated generally by reference numeral 270. The elements of this alternative cushioning assembly that are functionally analogous to those components discussed above regarding cushioning assembly 70 are designated by reference numerals identical to those listed above with the exception this embodiment uses reference numerals in the 200 series.

Cushioning assembly 270 is operably arranged between the radial shoulders 48 and 58 on the housing members 40 and 50, respectively, of apparatus 20 for cushioning over-travel of the housing members 40 and 50 during operation of apparatus 20. In the embodiment illustrated in FIGS. 11 and 12, the cushioning assembly 270 includes a carrier 272 and multipiece cushion 282 arranged in operable combination with carrier 272.

Cushion 282 includes two elastomeric cushions or bumpers 288a and 288b releasably connected to the carrier 272 by a series of fasteners 290 similar to fasteners 90 discussed above. In this embodiment, the bumpers 288a and 288b are substantially identical relative to each other and are substantially similar to the bumpers 88a, 88b discussed above. Suffice it to say, when cushioning assembly 270 is arranged in operable combination with apparatus 20, the bumpers 288a and 288b are disposed between the radial shoulders 48 and 58 on members 40 and 50, respectively, and wrap about or encircle the axially elongated extension or body portion 54 of the second member 50 of apparatus 20.

Carrier 272 is comprised of plural and generally planar segments 278a, 278b along with segments 278c and 278d which together form ring 272. In this embodiment, the segments 278a, 278b of carrier 272 are generally identical relative to each other and segments 278c, 278d of carrier 272 are generally identical relative to each other. In this embodiment, the segments 278a and 278b are of a different radial dimension that segments 278c and 278d. That is, carrier segments 278a and 278b are radially sized such that they bridge the opposed and juxtaposed ends of the bumpers 288a and 288b sufficiently so as to allow fasteners 290 to releasably secure the ends of the bumpers 288a and 288b to that underlying segment of the carrier 272. The other carrier segments 278c and 278d comprising ring 272 have a greater radial dimension that segments 278a and 278b and are secured using fasteners 290 to an underside of remaining portions of the bumpers 288a and 288b.

FIGS. 13 and 14 illustrate yet another alternative example or design for the cushioning assembly of the present invention disclosure. This alternative form of cushioning assembly is designated generally by reference numeral 370. The elements of this alternative cushioning assembly that are functionally analogous to those components discussed above regarding cushioning assembly 70 are designated by reference numerals identical to those listed above with the exception this embodiment uses reference numerals in the 300 series.

Cushioning assembly 370 is operably arranged between the radial shoulders 48 and 58 on the first and second housing members 40 and 50, respectively, of apparatus 20 for cushioning over-travel of the housing members 40 and 50 during operation of apparatus 20. In the embodiment illustrated in FIG. 11, the cushioning assembly 370 includes a multipiece cushion 382 including a series of individual elastomeric bumper segments 388a through 388r which together form a circular array or elastomeric ring arranged about the axially elongated extension or body portion 54 of the second member 50 of apparatus 20.

Preferably, the bumper segments 388a through 388r of cushion 382 are substantially identical relative to each other. It will be appreciated, however, more or less bumper segments than that shown in FIG. 14 can be used without detracting or departing from the spirit and scope of this invention disclosure. Moreover, each bumper segment 388a through 388r of cushion 382 is preferably formed from almost any elastomer, . i.e. rubber, nylon, urethane, plastics, composites, a HYTREL® type material sold by DuPont Corporation, and other like elastomers. Preferably, however, the elastomer used to form bumpers 388a through 388r has a Shore D durometer hardness ranging between about 40 and 55. Moreover, each bumper segment 388a through 388r has a predetermined non-compressed height between a lowermost surface 371 and an upper most surface 381. The predetermined non-compressed height PH of the bumper segments 388a through 388r are all about equal relative to each other and all are generally equal to the predetermined non-compressed height of cushioning assembly 70.

Figure 15:
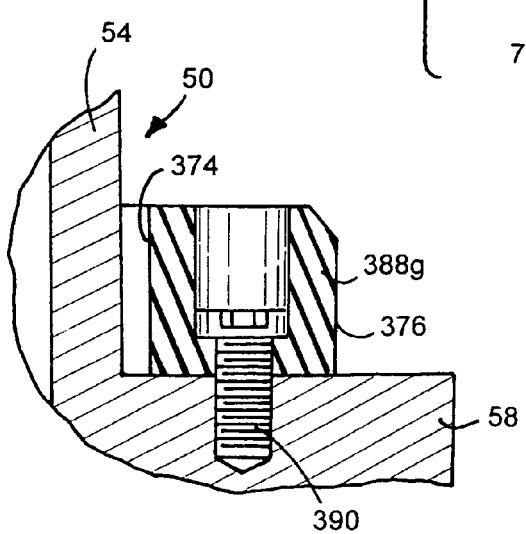
FIG. 15 is an enlarged sectional view taken along line 15-15 of FIG. 13.

In the embodiment illustrated by way of example in FIGS. 15, each bumper segment 388a through 388r is individually and releasably secured directly to the radial shoulder 58 of housing member 50 using a fastener 390. In one embodiment, and as shown in FIG. 15, the bumper segments 388a through 388r are preferably connected to the shoulder 58 of housing member 50 using a conventional headed fastener 390 similar to fastener 90 discussed above and which is recessed from the uppermost surface 381 of each bumper segment 388a through 388r so as to not interfere with operation of the cushioning assembly 370 during operation of apparatus 20. As such, and in keeping with this invention disclosure, when required or desired, the entire cushioning assembly 370 can be readily, quickly and advantageously replaced from about the axially elongated extension or body portion 54 of the second member 50 of apparatus 20 while maintaining the housing members 40 and 50, respectively, of apparatus 20 (FIG. 4) in operable combination relative to each other. As such, the present invention disclosure readily permits both repair and/or replacement of the over-travel cushion assembly without having to disassemble apparatus 20 thus saving time and effort while significantly reducing the time the vehicle on which apparatus 20 is arranged in operable combination remains out of service.

From the foregoing, it will be observed that numerous modifications and variations can be made and effected without departing or detracting from the true spirit and novel concept of this invention disclosure. Moreover, it will be appreciated, the present disclosure is intended to set forth exemplifications which are not intended to limit the disclosure to the specific embodiments illustrated. Rather, this disclosure is intended to cover by the appended claims all such modifications and variations as fall within the spirit and scope of the claims.

What is claimed is:

1. In combination with an apparatus having an axially elongated axis and includes a first member with an outer housing, a radial shoulder fixedly arranged toward a first end of said outer housing and a connector arranged toward a second end of said outer housing, a second member axially aligned relative to and in operable combination with said first member, said second member having an axially elongated cylindrical extension extending from a first end such that said extension is telescopically movable within the outer housing of said first member, a radial shoulder fixedly and axially spaced from the first end of said second member, and a connector arranged toward a second end of said second member, with the radial shoulders on said first and second members limiting axial travel of said apparatus, a device arranged in operable combination with said first and second members for cushioning an axial load exerted on said apparatus, and a cushioning assembly operably arranged between the radial shoulders on said first and second members, said cushioning assembly comprising:

a carrier arranged about the axially elongated extension on said second member and between the radial shoulders on said first and second members; and a multipiece cushion arranged in operable combination with said carrier between the radial shoulders on said first and second members for absorbing over-travel of said first and second members relative to each other, with said multipiece cushion including at least two elastomeric bumpers releasably connected to said carrier so as to permit replacement of said multipiece cushion while maintaining said first and second members in operable combination relative to each other.

2. The cushioning assembly according to claim 1, wherein each of said elastomeric bumpers has a Shore D durometer hardness ranging between about 40 and 55.

3. The cushioning assembly according to claim 1, wherein each of the elastomeric bumpers define between about 60% and about 85% of an overall thickness of said cushioning assembly.

4. The cushioning assembly according to claim 1, wherein each of said elastomeric bumpers has a generally semi-circular configuration, in plan, with opposed ends of each elastomeric bumper being interconnected to each other.

5. The cushioning assembly according to claim 4, wherein an inner diameter of each of said elastomeric bumpers is larger than the axially elongated cylindrical extension on said second member, and an outer diameter of each of said elastomeric bumpers is slightly less than a diameter of said carrier.

6. The cushioning assembly according to claim 4, wherein said carrier includes plural segments which together form a ring.

7. The cushioning assembly according to claim 6, wherein each segment of said carrier has a generally semi-circular configuration, in plan, with said segments of said carrier being radially offset relative to said elastomeric bumpers by about 90 degrees.

8. An apparatus having an elongated central axis and including a first member with an outer housing having a radial shoulder fixedly arranged toward one end thereof, a second member axially aligned relative to and in operable combination with said first member, said second member having an axially elongated cylindrical extension telescopically movable within the outer housing of said first member and a radial shoulder axially and fixedly spaced from a first end of said second member, with the radial shoulders on said first and second members limiting axial travel of said apparatus, a device arranged in operable combination with said first and second members for cushioning an axial load exerted on said apparatus, and a multipiece cushion assembly operably arranged between the radial shoulders on said first and second members, said multipiece cushion assembly including a series of elastomeric bumpers which together provide a circular array of bumpers arranged about said axially elongated cylindrical extension on said second member and between the radial shoulders on said first and second members for absorbing over-travel of said first and second members relative to each other, with said elastomeric bumpers being releasably interconnected to a carrier so as to permit replacement of said multipiece cushion assembly while maintaining said first and second members in operable combination relative to each other, with said carrier serving to limit deformation of said multipiece cushion assembly.

9. The apparatus according to claim 8, wherein each of said elastomeric bumpers of said cushion assembly has a Shore D durometer hardness ranging between about 40 and 55.

10. The apparatus according to claim 8, wherein each of the elastomeric bumpers of said multipiece cushion assembly defines between about 60% and about 85% of an overall thickness of said cushion assembly.

11. The apparatus according to claim 8, wherein each of said elastomeric bumpers of said cushion assembly has a generally semi-circular configuration, in plan, with opposed ends of each elastomeric bumper being interconnected to each other by said carrier.

12. The apparatus according to claim 11, wherein an inner diameter of the circular array of said elastomeric bumpers of said cushion assembly is larger than the axially elongated cylindrical extension on said second member, and an outer diameter of the circular array of said elastomeric bumpers is slightly less than a diameter of either radial shoulder on said first and second members.

13. The apparatus according to claim 8, wherein the carrier of said multipiece cushion assembly includes plural segments which interconnect at least two of said elastomeric bumpers to each other.

14. The apparatus according to claim 11, wherein each elastomeric bumper of said cushion assembly has a series of radially adjacent lugs on at least one face thereof.

15. The apparatus according to claim 8, wherein said carrier of said multipiece cushioning assembly includes plural segments which interconnect juxtaposed ends of said elastomeric bumpers relative to each other.

16. The apparatus according to claim 8, wherein said elastomeric bumpers of said cushion assembly are releasably interconnected to each other.

17. An apparatus including a first member having an outer housing with a radial shoulder fixedly arranged toward one end thereof, a second member axially aligned relative to and in operable combination with said first member, said second member having an axially elongated extension telescopically movable within the outer housing of said first member and a radial shoulder axially and fixedly spaced from a first end of said second member, with the radial shoulders on said first and second members limiting axial travel of said apparatus, a device arranged in operable combination with said first and second members for absorbing an axial load exerted on said apparatus, and a multipiece cushioning assembly operably arranged between the radial shoulders on said first and second members, said multipiece cushioning assembly including a series of individual elastomeric bumpers releasably secured in a circular array about said axially elongated extension and to the radial shoulder on said second member for absorbing over-travel of said first and second members relative to each other, with the releasable securement of said elastomeric bumpers to the radial shoulder on said second member permitting replacement of said multipiece cushioning assembly while maintaining said first and second members in operable combination relative to each other.

18. The apparatus according to claim 17, wherein each of said elastomeric bumpers of said cushioning assembly has a Shore D durometer hardness ranging between about 40 and 55.

19. The apparatus according to claim 17, wherein each of the elastomeric bumpers of said multipiece cushioning assembly define between about 60% and about 85% of an overall thickness of said cushioning assembly.

20. The apparatus according to claim 17, wherein each of said elastomeric bumpers of said cushioning assembly has a generally semi-circular configuration, with opposed ends of said elastomeric bumpers being interconnected to each other.

21. The apparatus according to claim 17, wherein an inner diameter of the circular array of said elastomeric bumpers of said cushioning assembly is larger than the axially elongated extension on said second member, and an outer diameter of the circular array of said elastomeric bumpers of said cushioning assembly is slightly less than a diameter of either radial shoulder on said first and second members.

22. A multipiece cushioning assembly adapted to be arranged in combination with a shock absorbing apparatus having a pair of radial shoulders on first and second telescoping members of said shock absorbing apparatus arranged in operable combination relative to each other, with the radial shoulders on said first and second members limiting travel of said shock absorbing apparatus, and with said multipiece cushioning assembly including a carrier configured for arrangement about and slidable along an axial extension on at least one of said telescoping members and a plurality of elastomeric bumpers arranged in a generally circular array between said radial shoulders on said first and second members for absorbing over-travel of said first and second members relative to each other and for permitting replacement of said multipiece cushioning assembly while maintaining said first and second members in operable combination relative to each other, with said carrier and said plurality of elastomeric bumpers being releasably interconnected to each other.

23. The multipiece cushioning assembly according to claim 22, wherein each of said elastomeric bumpers has a Shore D durometer hardness ranging between about 40 and 55.

24. The multipiece cushioning assembly according to claim 22, wherein each of the elastomeric bumpers define between about 60% and about 85% of an overall thickness of said cushioning assembly.

25. The multipiece cushioning assembly according to claim 22, wherein said carrier includes plural segments which interconnect at least two of said elastomeric bumpers to each other.

26. The multipiece cushioning assembly according to claim 25, wherein each of said elastomeric bumpers has a generally semi-circular configuration, in plan.

27. The multipiece cushioning assembly according to claim 26, wherein an inner diameter of the circular array of said elastomeric bumpers is larger than in an inside diameter of the radial shoulder on said second member, and an outer diameter of the circular array of said elastomeric bumpers is slightly less than an outer diameter of either radial shoulder on said first and second members.

28. The multipiece cushioning assembly according to claim 26, wherein each carrier segment has a generally semi-circular configuration, in plan, with said carrier segments being radially offset relative to said elastomeric bumpers by about 90 degrees.

29. The multipiece cushioning assembly according to claim 26, wherein each elastomeric bumper has series of radially adjacent lugs on at least one face thereof.

30. The multipiece cushioning assembly according to claim 22, wherein said carrier includes plural segments which interconnect juxtaposed ends of said elastomeric bumpers relative to each other.

* * * * *